United States Patent
Deng

(10) Patent No.: US 12,117,284 B2
(45) Date of Patent: Oct. 15, 2024

(54) METHOD AND APPARATUS FOR MEASURING GEOMETRIC PARAMETER OF OBJECT, AND TERMINAL

(71) Applicant: GUANGDONG OPPO MOBILE TELECOMMUNICATIONS CORP., LTD., Dongguan (CN)

(72) Inventor: Jian Deng, Dongguan (CN)

(73) Assignee: GUANGDONG OPPO MOBILE TELECOMMUNICATIONS CORP. LTD., Dongguan (CN)

( * ) Notice: Subject to any disclaimer, the term of this patent is extended or adjusted under 35 U.S.C. 154(b) by 484 days.

(21) Appl. No.: 17/478,611

(22) Filed: Sep. 17, 2021

(65) Prior Publication Data
US 2022/0003537 A1 Jan. 6, 2022

Related U.S. Application Data

(63) Continuation of application No. PCT/CN2020/082081, filed on Mar. 30, 2020.

(30) Foreign Application Priority Data

Apr. 15, 2019 (CN) .......................... 201910302960.6

(51) Int. Cl.
*G01B 11/03* (2006.01)
*G01B 11/00* (2006.01)
(Continued)

(52) U.S. Cl.
CPC ............ *G01B 11/03* (2013.01); *G01B 11/002* (2013.01); *G06T 7/55* (2017.01); *G06T 7/62* (2017.01); *G06T 7/73* (2017.01)

(58) Field of Classification Search
CPC .... G01B 11/03; G01B 11/002; G01B 5/0035; G01B 11/285; G01B 11/00; G01B 11/02;
(Continued)

(56) References Cited

U.S. PATENT DOCUMENTS 7,720,276 B1 * 5/2010 Korobkin ................ G06T 17/10
348/42
10,838,515 B1 * 11/2020 Yitzhak .................... G06T 7/73
(Continued)

FOREIGN PATENT DOCUMENTS

CN 104952058 A 9/2015
CN 105180802 A 12/2015
(Continued)

OTHER PUBLICATIONS

Extended European Search Report dated Apr. 29, 2022 received in European Patent Application No. EP 20790606.6.
(Continued)

*Primary Examiner* — Kathleen Y Dulaney
(74) *Attorney, Agent, or Firm* — Sheppard, Mullin, Richter & Hampton LLP

(57) ABSTRACT

Provided are a method and apparatus for measuring a geometric parameter of an object, and a terminal. The method includes: establishing a three-dimensional coordinate system based on a real environment, in accordance with a first depth image of the real environment photographed by a camera component; obtaining pose data of a terminal, obtaining a second depth image and a two-dimensional image of an object to be measured, and displaying the two-dimensional image on a display interface of the terminal; in response to a measurement point selection instruction, determining a coordinate in the three-dimensional coordinate system of a measurement point based on the pose data, the second depth image and the two-dimensional image, and determining a geometric parameter of the object to be measured based on the coordinate; and displaying, in the two-dimensional image, the geometric parameter of the object to be measured.

17 Claims, 8 Drawing Sheets

(51) Int. Cl.
*G06T 7/55* (2017.01)
*G06T 7/62* (2017.01)
*G06T 7/73* (2017.01)

(58) Field of Classification Search
CPC .......... G01B 11/26; G01B 11/28; G06T 7/55; G06T 7/62; G06T 7/73; G06T 2207/10028; G06T 7/50; G06T 2207/10012
USPC ................ 382/154, 106; 348/42; 702/155
See application file for complete search history.

(56) References Cited

U.S. PATENT DOCUMENTS

| | | | |
|---|---|---|---|
| 11,321,864 B1 * | 5/2022 | El Dokor | G06F 3/04847 |
| 2011/0288818 A1 * | 11/2011 | Thierman | G01B 17/00 702/155 |
| 2013/0308013 A1 * | 11/2013 | Li | G01S 17/894 348/231.3 |
| 2015/0146926 A1 * | 5/2015 | Ramachandran | H04N 23/68 382/103 |
| 2016/0109220 A1 | 4/2016 | Laffargue et al. | |
| 2017/0091957 A1 * | 3/2017 | Driegen | G06T 3/60 |
| 2017/0235983 A1 * | 8/2017 | Alwesh | G06Q 10/0875 235/385 |
| 2017/0264880 A1 * | 9/2017 | Zolotov | G06F 18/24 |
| 2018/0218513 A1 * | 8/2018 | Ho | G06T 7/579 |
| 2018/0253857 A1 * | 9/2018 | Driegen | G06T 7/85 |
| 2018/0338090 A1 * | 11/2018 | Iida | G06T 7/73 |
| 2020/0090361 A1 * | 3/2020 | Kim | G06T 17/10 |
| 2020/0304375 A1 * | 9/2020 | Chennai | G06V 20/10 |

FOREIGN PATENT DOCUMENTS

| | | |
|---|---|---|
| CN | 105976406 A | 9/2016 |
| CN | 106247951 A | 12/2016 |
| CN | 106352797 A | 1/2017 |
| CN | 106813568 A | 6/2017 |
| CN | 106839975 A | 6/2017 |
| CN | 107250719 A | 10/2017 |
| CN | 107894588 A | 4/2018 |
| CN | 107925727 A | 4/2018 |
| CN | 108304119 A | 7/2018 |
| CN | 108537834 A | 9/2018 |
| CN | 108613625 A | 10/2018 |
| CN | 108627092 A | 10/2018 |
| CN | 108682031 A | 10/2018 |
| CN | 108844456 A | 11/2018 |
| CN | 108844457 A | 11/2018 |
| CN | 108898676 A | 11/2018 |
| CN | 109186461 A | 1/2019 |
| CN | 109218702 A | 1/2019 |
| CN | 109509182 A | 3/2019 |
| CN | 109559371 A | 4/2019 |
| CN | 109615703 A | 4/2019 |
| CN | 110006343 A | 7/2019 |
| JP | 2017-118396 A | 6/2017 |
| KR | 10-2018-0106480 A | 10/2018 |

OTHER PUBLICATIONS

First Office Action from corresponding Chinese Application No. 202110071910.9, dated Mar. 29, 2022. English translation attached.
International Search Report and Written Opinion date Jun. 30, 2020 in International Application No. PCT/CN2020/082081. English translation attached.
First Office Action from corresponding Chinese Application No. 201910302960.6, dated Aug. 3, 2020. English translation attached.
Intent to Grant from corresponding Chinese Application No. 201910302960.6, dated Nov. 18, 2020. English translation attached.
Second Office Action from corresponding Chinese Application No. 202110071910.9, dated Jul. 26, 2022. English translation attached.
Intent to Grant from corresponding Chinese Application No. 202110071910.9, dated Oct. 9, 2020. English translation attached.
Communication pursuant to Article 94(3) EPC for European application 20790606.6 mailed Dec. 7, 2023.

* cited by examiner

---

301

Determining a pixel coordinate of the measurement point on the two-dimensional image based on a position of the measurement point on the two-dimensional image and a corresponding depth value

302

Mapping the pixel coordinate to the coordinates in the three-dimensional coordinate system based on parameter information of the camera component and the pose data

US 12,117,284 B2

METHOD AND APPARATUS FOR MEASURING GEOMETRIC PARAMETER OF OBJECT, AND TERMINAL

CROSS-REFERENCE TO RELATED APPLICATIONS

This application is a continuation of International Application No. PCT/CN2020/082081, filed on Mar. 30, 2020, which claims a priority to Chinese Patent Application No. 201910302960.6, titled "METHOD AND APPARATUS FOR MEASURING GEOMETRIC PARAMETER OF OBJECT, AND TERMINAL" and filed with the China National Intellectual Property Administration on Apr. 15, 2019. The disclosures of the aforementioned applications are hereby incorporated by reference in their entireties.

FIELD

The present disclosure belongs to the field of measurement technologies, and more particularly, to a method, apparatus, and terminal for measuring a geometric parameter of an object.

BACKGROUND

With the development of image processing technologies, it is now possible to recognize positions and postures of objects in the real world using images captured by a camera. Augmented Reality (AR) technology has provided application examples for such object recognition. The AR technology is a technology that can realize a combination and interaction between the virtual world on a screen and a scenario in the real world.

For example, during the object measurement employing the AR technology, measurement data in a virtual environment can be superimposed on an image of a real environment captured by a camera, thereby providing users with measurement convenience.

SUMMARY

Embodiments of the present disclosure provide a method and apparatus for measuring a geometric parameter of an object, and a terminal, capable of solving a technical problem of relatively great measurement errors in the current AR measurement technology.

In a first aspect, the embodiments of the present disclosure provide a method for measuring a geometric parameter of an object. The method includes: establishing a three-dimensional coordinate system based on a real environment in accordance with a first depth image of the real environment photographed by a camera component; obtaining pose data of a terminal, obtaining a second depth image and a two-dimensional image of an object to be measured, and displaying the two-dimensional image on a display interface of the terminal; in response to a measurement point selection instruction, determining a coordinate in the three-dimensional coordinate system of a measurement point based on the pose data, the second depth image and the two-dimensional image, and determining a geometric parameter of the object to be measured based on the coordinate; and displaying, in the two-dimensional image, the geometric parameter of the object to be measured.

In a second aspect, the embodiments of the present disclosure provide an apparatus for measuring a geometric parameter of an object. The apparatus includes: an establishing unit configured to establish a three-dimensional coordinate system based on a real environment in accordance with a first depth image of the real environment photographed by a camera component; a first display unit configured to obtain pose data of a terminal, obtain a second depth image and a two-dimensional image of an object to be measured, and display the two-dimensional image on a display interface of the terminal; a determining unit configured to, in response to a measurement point selection instruction, determine a coordinate in the three-dimensional coordinate system of a measurement point based on the pose data, the second depth image and the two-dimensional image, and determine a geometric parameter of the object to be measured based on the coordinate; and a second display unit configured to display the geometric parameter of the object to be measured in the two-dimensional image.

In a third aspect, the embodiments of the present disclosure provide a terminal. The terminal includes a camera component, a memory, a processor, and a computer program stored on the memory and executable on the processor. The processor is configured to, when executing the computer program, implement steps of the method as described above.

In a fourth aspect, the embodiments of the present disclosure provide a computer-readable storage medium. The computer-readable storage medium has a computer program. The computer program, when executed by a processor, implements steps of the method as described above.

BRIEF DESCRIPTION OF DRAWINGS

In order to clearly explain technical solutions of embodiments of the present disclosure, drawings used in the embodiments are briefly described below. It should be understood that the drawings as described below merely illustrate some embodiments of the present disclosure, and should not be construed as limiting the scope. Based on these drawings, other drawings can be obtained by those skilled in the art without creative effort.

DESCRIPTION OF EMBODIMENTS

Figure 1:
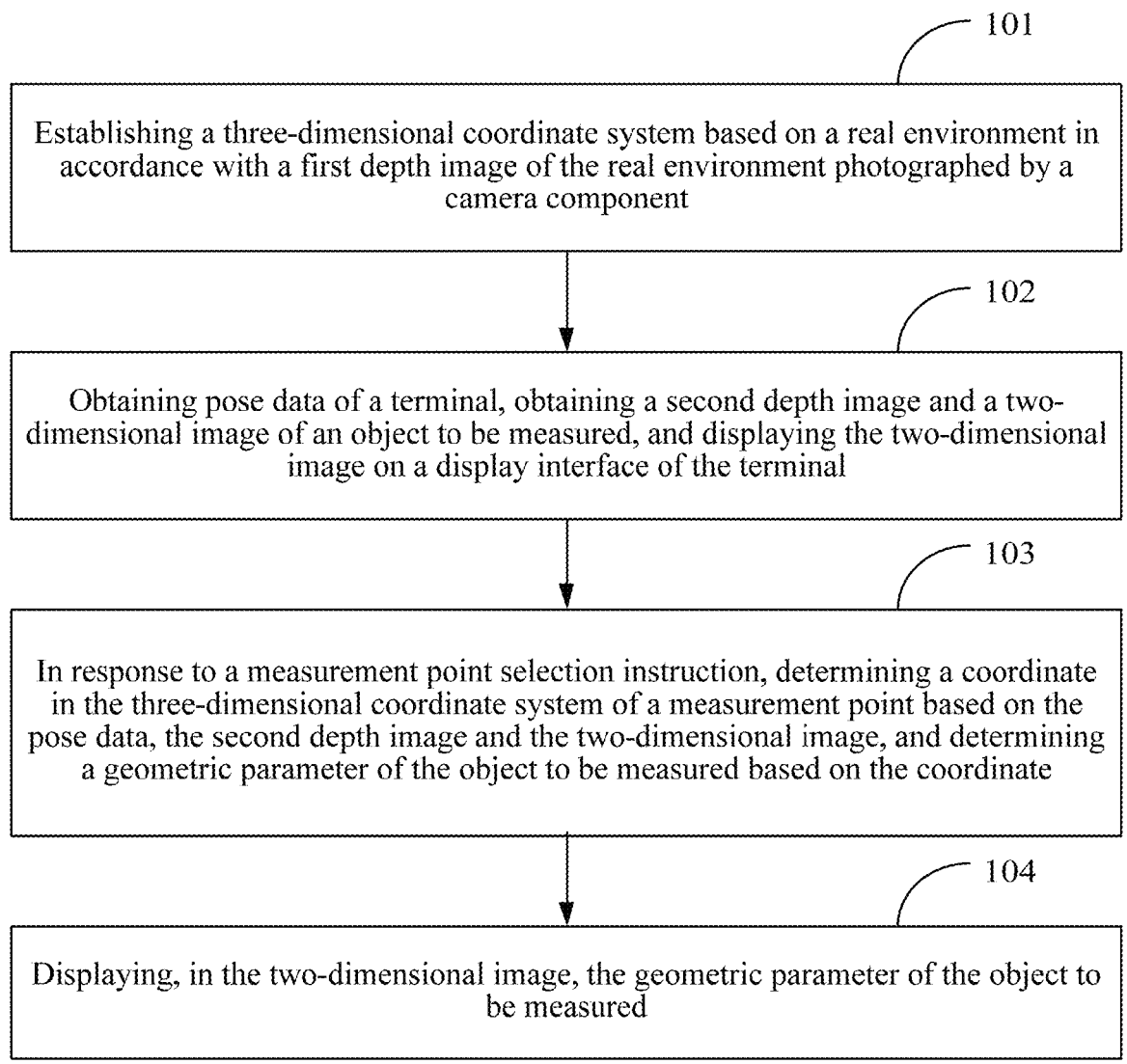
FIG. 1 is a flowchart illustrating an implementation of a method for measuring a geometric parameter of an object according to an embodiment of the present disclosure.

In order to make objects, technical solutions, and advantages of the present disclosure more obvious and understandable, the present disclosure will be further described in detail below in conjunction with the accompanying drawings and embodiments. It should be understood that specific embodiments described here are only used to explain, rather than limit, the present disclosure. In addition, in the description of the present disclosure, terms "first", "second", etc., are only used to distinguish the described objects, and cannot be construed as indicating or implying relative importance.

Currently, when a monocular camera is used for AR measurement, it is generally necessary to guide a user to move a terminal. The monocular camera takes a plurality of frames of consecutive photos, and performs plane recognition based on predetermined rules. The recognized plane serves as a reference to perform the AR measurement. Such a measurement method has a problem of slow initialization speed. In addition, this measurement method needs to rely on plane measurement or rich texture scenarios for measurement. In this way, for a vertical plane lacking rich texture, and when a color of the vertical plane is close to a color of a horizontal plane connected to the vertical plane, it is difficult for such a measurement method to recognize the vertical plane, and it is even possible that the vertical plane may be mistaken for a horizontal plane that is very far from the terminal, thereby resulting in large measurement errors.

In order to solve this technical problem, in the embodiments of the present disclosure, a three-dimensional coordinate system based on a real environment is established by obtaining a first depth image of the real environment photographed by a camera component, and thus initialization before measurement is completed. After the initialization is completed, pose data of the terminal is obtained in real time, and a second depth image and a two-dimensional image of an object to be measured are obtained. Meanwhile, a measurement point selection instruction triggered by a user is received. A coordinate in the three-dimensional coordinate system of a measurement point selected in accordance with the measurement point selection instruction is determined based on the pose data, the second depth image and the two-dimensional image, thereby determining a geometric parameter of the object to be measured based on the coordinate, and realizing the measurement of the geometric parameter of the object to be measured. A measurement mark of the measurement point and the geometric parameter of the object to be measured are displayed in the two-dimensional image displayed on the display interface. Instead of relying on plane recognition, this measurement method determines coordinates of a measurement point associated with the object to be measured in the three-dimensional coordinate system based on the pose data of the terminal, and the second depth image and the two-dimensional image of the object to be measured, and further determines the geometric parameter of the object to be measured based on the coordinates. With the measurement method of the present disclosure, the vertical plane lacking rich texture can be effectively recognized, and an accurate determination is also possible in a case that the color of the vertical plane is close to the color of the horizontal plane connected to the vertical plane, thereby avoiding the vertical plane being mistaken for the horizontal plane that is very far from the terminal. Therefore, the measurement accuracy of the AR measurement technology is improved.

FIG. 1 is a flowchart illustrating an implementation of a method for measuring a geometric parameter of an object according to an embodiment of the present disclosure. The measurement method can be applied in a terminal, can be executed by an apparatus, equipped on the terminal, for measuring the geometric parameter of the object, and is applicable to a situation where accuracy of the object measurement needs to be improved. The terminal may include smart terminals such as a smart phone, a tablet computer, and a learning machine. The terminal may be provided with a camera component. The method for measuring the geometric parameter of the object may include step 101 to step 104.

In step 101, a first depth image of a real environment photographed by a camera component is obtained, and a three-dimensional coordinate system based on the real environment is established based on the first depth image.

When the geometric parameter of the object is measured, the first depth image of the real environment photographed by the camera component needs to be obtained to establish the three-dimensional coordinate system based on the real environment, thereby completing the initialization of the measurement.

The camera component may include a depth camera and a Red, Green, Blue (RGB) camera. The depth camera may be configured to collect a depth image, and the RGB camera may be configured to collect a two-dimensional color image (a two-dimensional image).

A gray value of each pixel of the depth image can characterize a distance of a certain point in a scenario from the camera.

In some embodiments of the present disclosure, resolution of the depth camera may be equal to resolution of the RGB camera, such that each pixel on the two-dimensional image can obtain accurate depth information.

In some embodiments of the present disclosure, the depth camera may be a Time-of-Flight (TOF) camera.

In some embodiments of the present disclosure, the camera component may also be a three dimensional (3D) camera that can simultaneously output the depth image and the two-dimensional color image.

When the terminal is used to measure the geometric parameter of the object, a camera application may be opened to activate the camera component, so as obtain the first depth image of the real environment. When the first depth image returned by the depth camera is received, a point in the real environment corresponding to any piece of effective depth data in the first depth image may be determined as a coordinate origin to establish the three-dimensional coordinate system based on the real environment, and to serve as a reference basis for coordinate calculation when measuring the geometric parameter of the object. The effective depth data refers to depth data having a depth value within a predetermined depth value range.

Figures 2, 3:
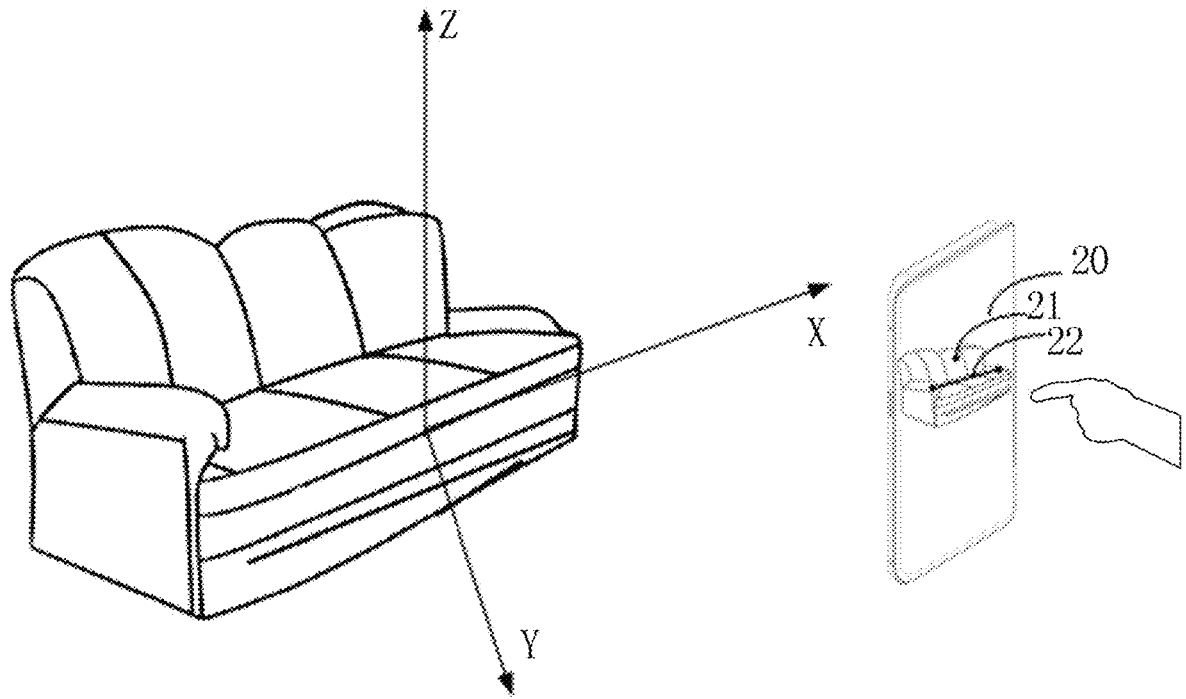
FIG. 2 is a schematic diagram of a measurement process of a geometric parameter of an object according to an embodiment of the present disclosure.
FIG. 3 is a flowchart illustrating a specific implementation process of step 103 of a method for measuring a geometric parameter of an object according to an embodiment of the present disclosure.

For example, as illustrated in FIG. 2, the three-dimensional coordinate system based on the real environment may be established by taking any point on the sofa as the coordinate origin.

It should be noted that, in the embodiments of the present disclosure, the completion of an establishment of the three-dimensional coordinate system means that the camera component has completed the initialization before measurement, and thus is ready for the measurement of the geometric parameter of the object. Since such an initialization process may neither require the plane recognition, nor require movement of the terminal and collection of a plurality of frames of images, the measurement of the geometric parameter of the object according to the present disclosure has a characteristic of fast initialization speed, and can achieve an effect of "flash opening".

In step 102, pose data of a terminal is obtained, a second depth image and a two-dimensional image of an object to be measured are obtained, and the two-dimensional image is displayed on a display interface of the terminal.

Since the user may move the terminal when using the terminal to measure the geometric parameter of the object, it is necessary to obtain the pose data of the terminal, in order to determine a pose change of the terminal at the current moment relative to the moment when the initialization is completed, and to determine, based on the pose change, the second depth image of the object to be measured photographed by the camera component and coordinates in the three-dimensional coordinate system of each pixel in the two-dimensional image.

Optionally, said obtaining the pose data of the terminal includes: obtaining, upon a completion of an establishment of the three-dimensional coordinate system, six-degrees-of-freedom pose data of the terminal in real time by using an Inertial Measurement Unit (IMU).

An object has six degrees of freedom in space, i.e., degrees of freedom of movement along directions of three rectangular coordinate axes, x, y, and z, and degrees of freedom of rotation around these three coordinate axes. Therefore, the six degrees of freedom must be clearly understood to completely determine a position of the object.

The IMU is a device configured to measure a three-axis angular velocity and an acceleration of an object. Generally, one IMU contains accelerometers of three individual axes and gyroscopes of the three individual axes. The accelerometers detect accelerations of the object on three independent axes of a carrier coordinate system, while the gyroscopes detect an angular velocity of a carrier relative to a navigation coordinate system. The angular velocity and accelerations of the object in three-dimensional space are measured as basis to calculate a posture of the object. Therefore, in the present disclosure, the IMU may be used to obtain the pose data of the terminal.

In step 103, a measurement point selection instruction is received, a coordinate in the three-dimensional coordinate system of a measurement point selected in accordance with the measurement point selection instruction is determined based on the pose data, the second depth image and the two-dimensional image, and the geometric parameter of the object to be measured is determined based on the coordinate. the measurement point is associated with the object to be measured.

After obtaining the pose data of the terminal as well as the second depth image and the two-dimensional image of the object to be measured, the user can trigger the measurement point selection instruction on the display interface based on the two-dimensional image displayed on the display interface of the terminal, such that the terminal may determine, based on the pose data, the second depth image and the two-dimensional image, the coordinate in the three-dimensional coordinate system of the measurement point selected in accordance with the measurement point selection instruction, and determine the geometric parameter of the object to be measured based on the coordinate.

For example, as illustrated in FIG. 2, the user can trigger the measurement point selection instruction by clicking on a point 21 or sliding a drawn line 22 on the display interface 20 of the terminal to determine the object to be measured and the measurement point that is already associated with the object to be measured.

Optionally, as illustrated in FIG. 3, step 301 to step 302 are included in said determining, based on the pose data, the second depth image and the two-dimensional image, the coordinate in the three-dimensional coordinate system of the measurement point selected in accordance with the measurement point selection instruction.

In step 301, a pixel coordinate of the measurement point on the two-dimensional image is determined based on a position of the measurement point on the two-dimensional image and a corresponding depth value.

In the embodiments of the present disclosure, the pixel coordinate refers to a coordinate composed of a relative position relationship between respective pixels on the two-dimensional image and a depth value of respective pixels.

For example, a pixel at the lower left corner of the two-dimensional image can be determined as a two-dimensional coordinate origin to establish a pixel coordinate system. A two-dimensional coordinate of each pixel in the two-dimensional image can be determined, and the two-dimensional coordinate can be combined with the depth value of each pixel in the two-dimensional image to obtain the pixel coordinate of each pixel in the two-dimensional image.

In step 302, the pixel coordinate is mapped to the coordinate in the three-dimensional coordinate system based on parameter information of the camera component and the pose data.

Said mapping the pixel coordinate to the coordinate in the three-dimensional coordinate system based on the parameter information of the camera component and the pose data includes: determining, based on the parameter information of the camera component and the pose data of the terminal, a mapping matrix between pixel coordinates of the two-dimensional image on the display interface of the terminal and coordinates in the three-dimensional coordinate system, and mapping the pixel coordinate to the coordinate in the three-dimensional coordinate system based on the mapping matrix.

The parameter information of the camera component includes internal parameters and external parameters of the camera component. The internal parameters include equivalent focal lengths $f_x$ and $f_y$ in a u-axis direction and a v-axis direction, and a coordinate (u0, v0) of an actual center point of an image plane.

In step 104, a measurement mark of the measurement point and the geometric parameter of the object to be measured are displayed in the two-dimensional image displayed on the display interface.

The geometric parameters may include a distance parameter, a length parameter, an area parameter, and an angle parameter.

Figure 4:
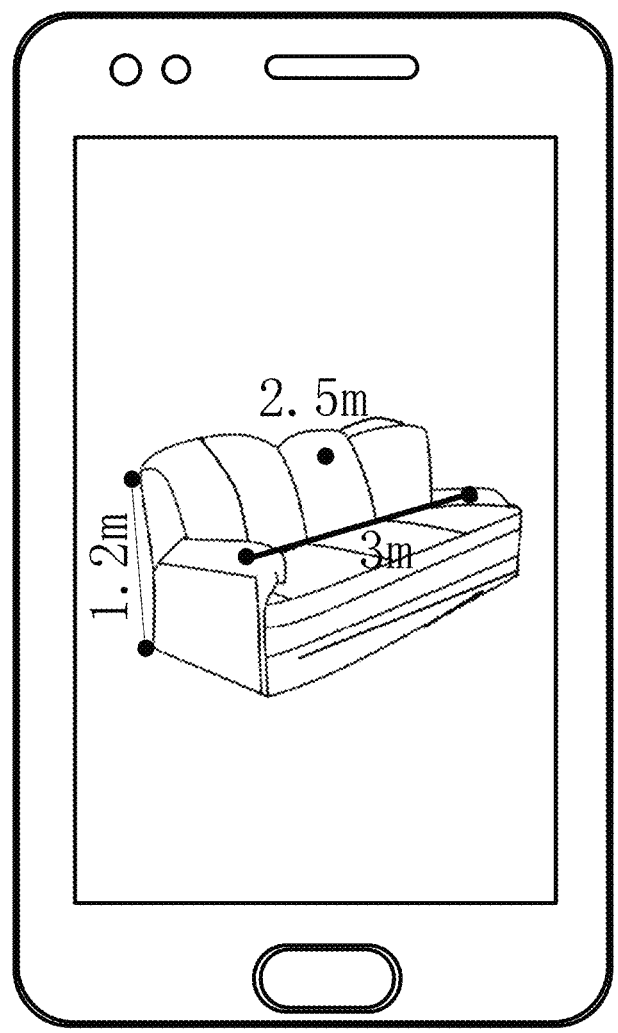
FIG. 4 is a first schematic diagram of a display interface according to an embodiment of the present disclosure.

For example, as illustrated in FIG. 4, the measurement mark may be a solid black dot "•", and the geometric parameters may include the distance parameter of 2.5 m, the length parameters of 3 m, 1.2 m, the area parameter, and the angle parameter.

In other embodiments of the present disclosure, the measurement mark may also be in another form. For example, the measurement mark can be a hollow dot, a solid black triangle, etc., which are merely illustrative but not intended to limit the scope of the present disclosure.

Optionally, in some embodiments of the present disclosure, subsequent to receiving the measurement point selection instruction, determining, based on the pose data, the second depth image and the two-dimensional image, the coordinate in the three-dimensional coordinate system of the measurement point selected in accordance with the measurement point selection instruction, and determining the geometric parameter of the object to be measured based on the coordinate, the method may further include: saving the coordinate of the measurement point and the geometric parameter determined based on the coordinate of the measurement point; and when a display region of the display interface includes a saved measurement point, displaying the measurement mark of the saved measurement point, and displaying the geometric parameter corresponding to the coordinate of the saved measurement point.

That is, every time a measurement point is measured, the coordinate of the measurement point and the geometric parameter determined based on the coordinate of the measurement point need to be saved. In this way, when the terminal moves to another position to measure a measurement point, data of the saved measurement points will not disappear. When the display region of the display interface of the terminal includes the saved measurement point, the measurement mark of the saved measurement point is continuously displayed, and the geometric parameter corresponding to the coordinate of the saved measurement point is displayed. Therefore, the terminal will not lose historical measurement data due to position movements, thereby facilitating implementing mobile measurement by the user.

It should be noted that, since the terminal saves coordinate data, the data of the saved measurement point will not change with the changes of the object in the real environment. However, in the data of the saved measurement point, distance data may change with the changes of position of the terminal.

Figure 5:
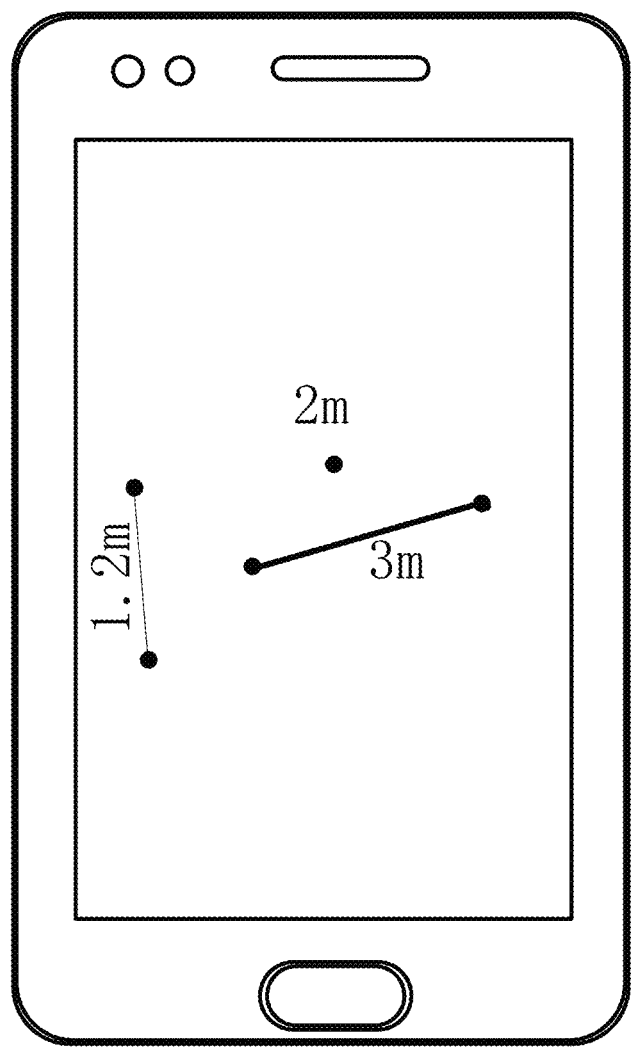
FIG. 5 is a second schematic diagram of a display interface according to an embodiment of the present disclosure.

For example, as illustrated in FIG. 5, after the user completes measurement of length data and distance data of the sofa, if the sofa is moved to another position and the terminal is moved 0.5 m along a direction towards an original position of the sofa, it may be observed that the length data of the sofa is still be displayed in the display region of the display interface of the terminal. The length data does not disappear due to the movement of the sofa. In addition, since the length data is a distance value between two coordinates, the length data will not change with the position changes of the terminal. However, since the distance parameter in the geometric parameters is a distance value between the measurement point and the terminal, the distance parameter may change with the position changes of the terminal.

Optionally, in the embodiments described above, prior to the above step 103 of receiving the measurement point selection instruction, the method may further include: obtaining a current measurement mode of the terminal. The current measurement modes may include one or more of a distance measurement mode, a length measurement mode, an area measurement mode, and an angle measurement mode.

That is, the above measurement modes are separated from each other. In the distance measurement mode, only distance measurement is performed. In the length measurement mode, only length measurement is performed. In the area measurement mode, only area measurement is performed. In the angle measurement mode, only angle measurement is performed.

Figure 6:
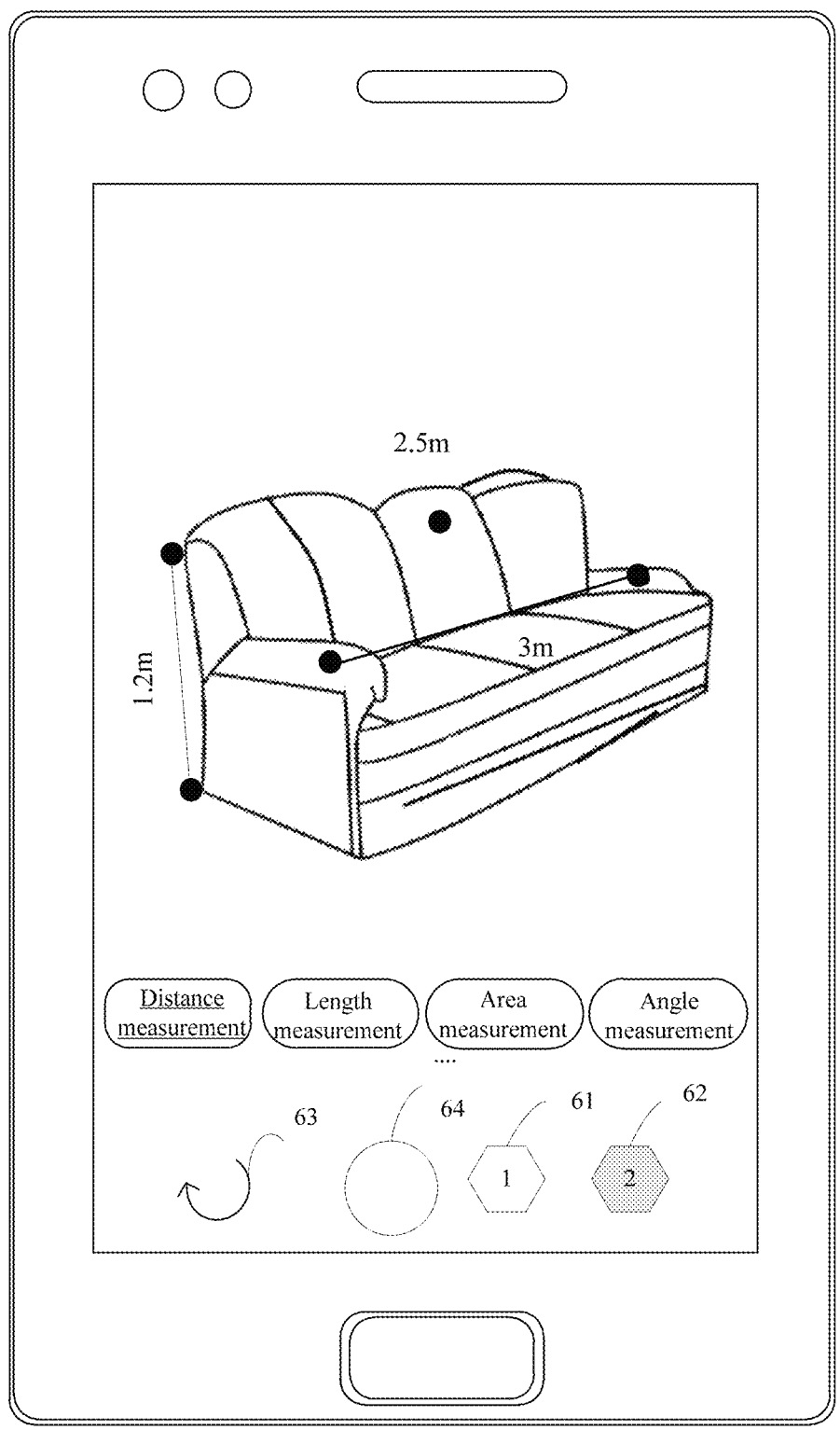
FIG. 6 is a third schematic diagram of a display interface according to an embodiment of the present disclosure.

For example, as illustrated in FIG. 6, one of the measurement modes can be selected by sliding, in order to measure the geometric parameter.

Correspondingly, said determining the geometric parameter of the object to be measured based on the coordinate includes: determining, in response to the current measurement mode of the terminal being the distance measurement mode, a distance parameter between the object to be measured and the terminal based on the coordinate; determining, in response to the current measurement mode of the terminal being the length measurement mode, a length parameter of the object to be measured based on the coordinate; determining, in response to the current measurement mode of the terminal being the area measurement mode, an area parameter of the object to be measured based on the coordinate; and determining, in response to the current measurement mode of the terminal being the angle measurement mode, an angle parameter of the object to be measured based on the coordinate.

If the current measurement mode of the terminal is the distance measurement mode, a single measurement point selection instruction is received. A coordinate in the three-dimensional coordinate system of a measurement point selected in accordance with the single measurement point selection instruction is determined based on the pose data, the second depth image and the two-dimensional image. The distance parameter between the object to be measured and the terminal is determined based on the coordinate.

If the current measurement mode of the terminal is the length measurement mode, an instruction of drawing one line segment or multiple line segments associated with the object to be measured is received, endpoint coordinates of a line segment drawn by the instruction of each line segment are determined based on the pose data, the second depth image and the two-dimensional image, and the length parameter of the object to be measured is determined based on the endpoint coordinates.

In some embodiments of the present disclosure, when drawing the line segment, the endpoint coordinates of the line segment drawn by the instruction of drawing each line segment are determined in real time based on the pose data, the second depth image and the two-dimensional image, a length of each line segment is determined based on the endpoint coordinates, and the length parameter of the object to be measured is updated in real time based on the drawing of the line segment.

If the current measurement mode of the terminal is the area measurement mode, instructions of drawing a plurality of line segments associated with the object to be measured are received. Endpoint coordinates of a line segment drawn by the instruction of drawing each line segment are determined based on the pose data, the second depth image and the two-dimensional image. The area parameter of a closed figure enclosed by the plurality of line segments is determined based on the endpoint coordinates.

In some embodiments of the present disclosure, in the area measurement mode, a perimeter of the closed figure enclosed by the plurality of line segments can also be automatically calculated.

If the current measurement mode of the terminal is the angle measurement mode, instructions of drawing two consecutive line segments associated with the object to be measured are received, endpoint coordinates of line segments drawn by the instructions of drawing two consecutive line segments are determined based on the pose data, the second depth image and the two-dimensional image, and an angle of an included angle between the two consecutive line segments drawn by the instructions of drawing two consecutive line segments is determined based on the endpoint coordinates.

In the embodiments described above, in a process of measuring the geometric parameter of the object, it is necessary to receive a corresponding measurement point selection instruction. To make the measurement of the geometric parameter of the object more convenient, in some embodiments of the present disclosure, the current measurement mode may also include a first automatic measurement mode.

For example, the user can trigger the first automatic measurement mode by clicking a first automatic measurement mode selection control 61 illustrated in FIG. 6.

Figure 7:
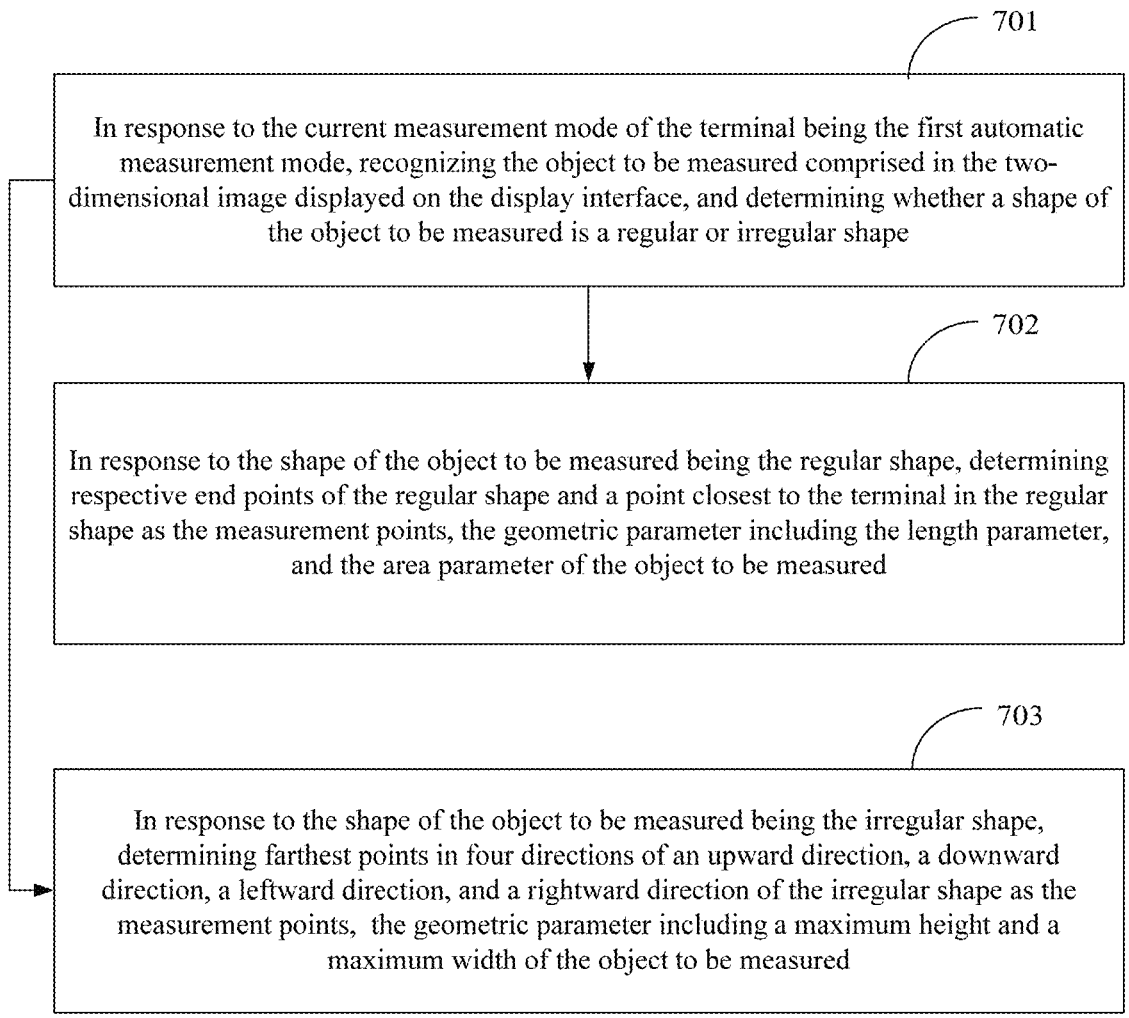
FIG. 7 is a flowchart of a method for measuring a geometric parameter of an object in a first automatic measurement mode according to an embodiment of the present disclosure.

FIG. 7 is a flowchart illustrating a method for measuring a geometric parameter of an object in a first automatic measurement mode according to an embodiment of the present disclosure. In the first automatic measurement mode, the method for measuring the geometric parameter of the object may further include step 701 to step 703.

In step 701, in response to the current measurement mode of the terminal being the first automatic measurement mode, the object to be measured contained in the two-dimensional image displayed on the display interface is recognized, and it is determined whether a shape of the object to be measured is a regular or irregular shape.

In step 702, in response to the shape of the object to be measured being the regular shape, respective end points of the regular shape and a point closest to the terminal in the regular shape are determined as the measurement points, the coordinates of the measurement points in the three-dimensional coordinate system are determined based on the pose data, the second depth image and the two-dimensional image; and the distance parameter, the length parameter, and the area parameter of the object to be measured are determined based on the coordinates.

In step 703, in response to the shape of the object to be measured being the irregular shape, farthest points in four directions of an upward direction, a downward direction, a leftward direction, and a rightward direction of the object having the irregular shape are determined as the measurement points; the coordinates of the measurement points in the three-dimensional coordinate system are determined based on the pose data, the second depth image and the two-dimensional image; and a maximum height and a maximum width of the object to be measured are determined based on the coordinates.

In an embodiment of the present disclosure, the regular shape refers to a shape such as a quadrilateral, a triangle, a circle, and a pentagon.

When choosing a household item to purchase, or in some other application scenarios, the user may only want to know a height and a width of an object, in order to roughly determine a size of the space required for the object. Therefore, to make the measurement of the geometric parameter of the object more convenient, corresponding automatic measurement can be performed by recognizing whether the object to be measured is of the regular shape.

For example, for an object with a regular shape such as a door, a window, a refrigerator, and a bookcase, respective end points of the regular shape and a point closest to the terminal in the regular shape may be determined as the measurement points. The coordinates of the measurement points in the three-dimensional coordinate system are determined based on the pose data, the second depth image and the two-dimensional image. The distance parameter, the length parameter, and the area parameter of the object to be measured are determined based on the coordinates.

For an object with an irregular shape such as a hair dryer and a potted plant, the farthest points in the four directions of the upward direction, the downward direction, the leftward direction, and the rightward direction of the object with the irregular shape can be determined as the measurement points. The coordinates of the measurement points in the three-dimensional coordinate system can be determined based on the pose data, the second depth image and the two-dimensional image. The maximum height and the maximum width of the object to be measured can be determined based on the coordinates.

Figure 8:
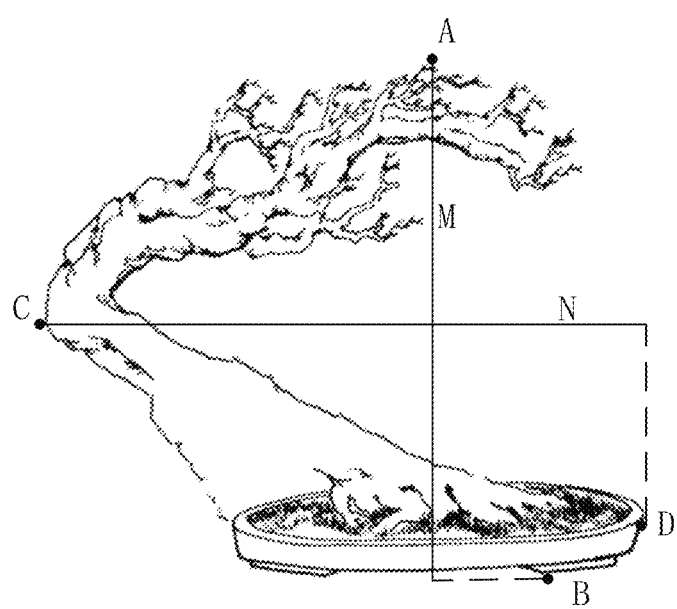
FIG. 8 is a schematic diagram illustrating a measurement of a geometric parameter of an irregularly shaped object according to an embodiment of the present disclosure.

For example, as illustrated in FIG. 8, the farthest points A, B, C, and D in four directions of the upward direction, the downward direction, the leftward direction, and the rightward direction of the object with the irregular shape are determined as the measurement points. A vertical height M between the measurement points A and B is determined as the maximum height of the object to be measured, and a horizontal width N between the measuring points C and D is determined as the maximum width of the object to be measured.

Optionally, in some embodiments of the present disclosure, the current measurement mode may further include an automatic measurement mode based on the distance measurement mode, and an automatic measurement mode based on the length measurement mode. Compared with the first automatic measurement mode illustrated in FIG. 7, the measurement modes in these embodiments have higher flexibility.

That is, in the automatic measurement mode based on the distance measurement mode, only the distance is automatically measured, and in the automatic measurement mode based on the length measurement mode, only the length is automatically measured.

For example, through clicking an automatic measurement mode selection control 62 illustrated in FIG. 6 by the user and in combination with the current distance measurement mode of the terminal, the automatic measurement mode based on the distance measurement mode may be triggered.

Optionally, in response to the current measurement mode of the terminal being the automatic measurement mode based on the distance measurement mode, the object to be measured contained in the two-dimensional image displayed on the display interface is recognized, a point closest to the terminal in the object to be measured is determined as the measurement point, the coordinate of the measurement point in the three-dimensional coordinate system is determined based on the pose data, the second depth image and the two-dimensional image, and the distance parameter of the object to be measured is determined based on the coordinate.

In response to the current measurement mode of the terminal being the automatic measurement mode based on the length measurement mode, the object to be measured contained in the two-dimensional image displayed on the display interface is recognized, and it is determined whether a shape of the object to be measured is a regular or irregular shape. In response to the shape of the object to be measured being the regular shape, respective end points of the regular shape are determined as the measurement points; the coordinates of the measurement points in the three-dimensional coordinate system are determined based on the pose data, the second depth image and the two-dimensional image; and the length parameter between adjacent measurement points of the object to be measured is determined based on the coordinates. In response to the shape of the object to be measured being the irregular shape, farthest points in four directions of an upward direction, a downward direction, a leftward direction, and a rightward direction of the irregular shape are determined as the measurement points; the coordinates of the measurement points in the three-dimensional coordinate system are determined based on the pose data, the second depth image and the two-dimensional image; and a maximum height and a maximum width of the object to be measured are determined based on the coordinates.

It should be noted that in any of the embodiments described above, as illustrated in FIG. 6, a previous measurement instruction can also be canceled by clicking a cancel control 63, e.g., canceling a previous measurement point selection instruction or a previous area measurement instruction, etc. The measurement data can also be saved by clicking a photographing control 64. That is the measurement data may be saved in a form of a photo carrying the measurement data.

It should be understood that numerical values of sequence numbers of respective steps in the above embodiments do not indicate an order of execution. The order of execution of respective processes should be determined by functions and internal logics of the processes, and should not constitute any limitation on an implementation process of the embodiments of the present disclosure.

Figure 9:
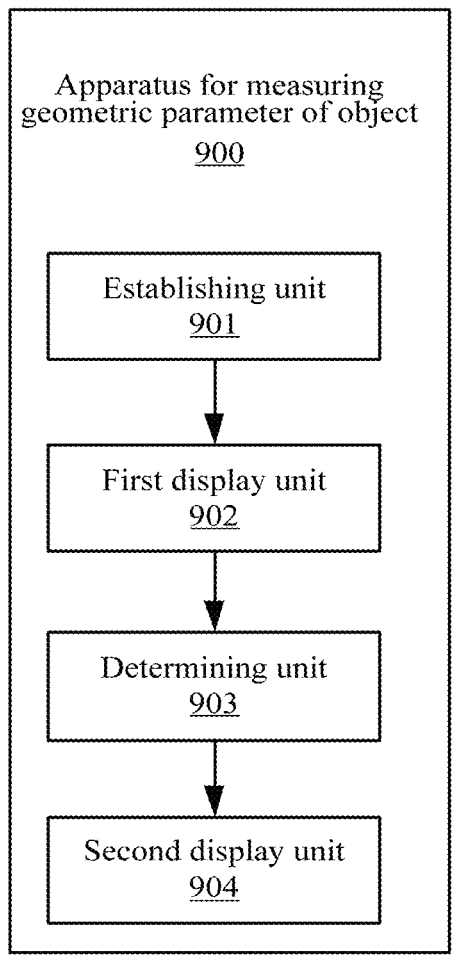
FIG. 9 is a schematic structural diagram of an apparatus for measuring a geometric parameter of an object according to an embodiment of the present disclosure.

FIG. 9 is a schematic structural diagram of an apparatus 900 for measuring a geometric parameter of an object according to an embodiment of the present disclosure. The apparatus for measuring the geometric parameter of the object may be applied in a terminal. The apparatus may include an establishing unit 901, a first display unit 902, a determining unit 903, and a second display unit 904.

The establishing unit 901 is configured to: obtain a first depth image of a real environment photographed by a camera component, and establish a three-dimensional coordinate system based on the real environment in accordance with the first depth image.

The first display unit 902 is configured to obtain pose data of a terminal, obtain a second depth image and a two-dimensional image of an object to be measured, and display the two-dimensional image on a display interface of the terminal.

The determining unit 903 is configured to: receive a measurement point selection instruction; determine a coordinate in the three-dimensional coordinate system of a measurement point selected in accordance with the measurement point selection instruction based on the pose data, the second depth image and the two-dimensional image; and determine a geometric parameter of the object to be measured based on the coordinate. the measurement point is associated with the object to be measured.

The second display unit 904 is configured to display a measurement mark of the measurement point and the geometric parameter of the object to be measured.

It should be noted that, for convenience and conciseness of description, a specific working process of the apparatus 900 for measuring the geometric parameter of the object described above may refer to a corresponding process of the method described with reference to FIG. 1 to FIG. 5, which is not repeated herein.

Figure 10:
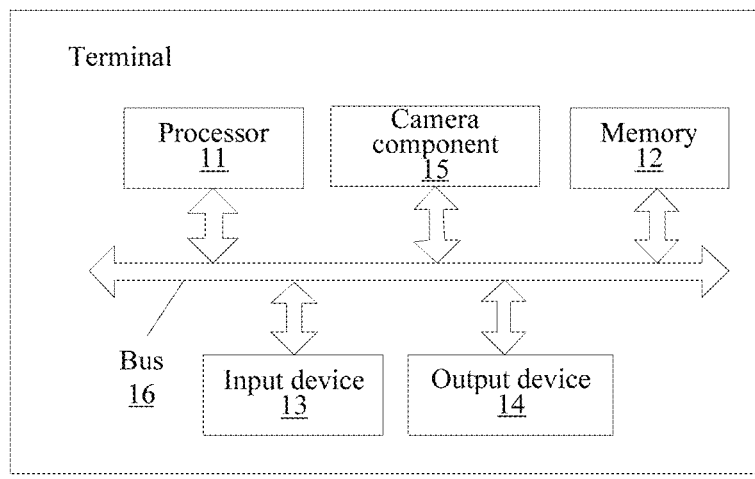
FIG. 10 is a schematic structural diagram of a terminal according to an embodiment of the present disclosure.

As illustrated in FIG. 10, the present disclosure provides a terminal for implementing the method for measuring the geometric parameter of the object. The terminal may be a smart phone, a tablet computer, a Personal Computer (PC), a learning machine, etc. The terminal may include a processor 11, a memory 12, one or more input devices 13 (FIG. 10 illustrates only one input device), one or more output devices 14 (FIG. 10 illustrates only one output device), and a camera component 15. The processor 11, the memory 12, the input device 13, the output device 14, and the camera component 15 are connected through a bus 16.

It should be understood that in the embodiments of the present disclosure, the processor 11 may be a central processing unit. The processor may also be any other general-purpose processor, a digital signal processor, an application-specific integrated circuit, a field programmable gate array, or any other programmable logic device, a discrete gate or a transistor logic device, a discrete hardware component, and the like. The general-purpose processor may be a microprocessor, or the processor may also be any conventional processor or the like.

The input device 13 may include a virtual keyboard, a touch panel, a fingerprint sensor (configured to collect fingerprint information of the user and fingerprint orientation information), a microphone, and the like. The output device 14 may include a display, a speaker, and the like.

The memory 12 may include a read-only memory and a random access memory, and may be configured to provide instructions and data to the processor 11. A part or the whole of the memory 12 may also include a non-volatile random access memory. For example, the memory 12 may also store device type information.

The memory 12 may be configured to store a computer program. The computer program can be run on the processor 11. For example, the computer program may be a program of the method for measuring the geometric parameter of the object. The above-mentioned processor 11 may be configured to, when executing the computer program, implement steps in the embodiments of the method for measuring the geometric parameter of the object, e.g., step 101 to step 103 illustrated in FIG. 1. Alternatively, the processor 11 may be configured to, when executing the computer program, implement functions of each module/unit in the above embodiments of the apparatus, e.g., functions of the units 901 to 904 illustrated in FIG. 9.

The computer program may be divided into one or more modules/units. The one or more modules/units may be stored in the memory 12 and executed by the processor 11 to complete the present disclosure. The one or more modules/units may be a series of computer program instruction segments capable of implementing specific functions. The instruction segments are used to describe an execution process of the computer program in the terminal configured to measure the geometric parameter of the object. For example, the computer program can be divided into an establishing unit, a first display unit, a determining unit, and a second display unit. Specific functions of respective units are as follows. The establishing unit is configured to: obtain a first depth image of a real environment photographed by a camera component, and establish a three-dimensional coordinate system based on the real environment in accordance with the first depth image. The first display unit is configured to: obtain pose data of a terminal, obtain a second depth image and a two-dimensional image of an object to be measured, and display the two-dimensional image on a display interface of the terminal. The determining unit is configured to: receive a measurement point selection instruction, determine a coordinate in the three-dimensional coordinate system of a measurement point selected in accordance with the measurement point selection instruction based on the pose data, the second depth image and the two-dimensional image, and determine a geometric parameter of the object to be measured based on the coordinate. the measurement point is associated with the object to be measured. The second display unit is configured to display a measurement mark of the measurement point and the geometric parameter of the object to be measured.

Those skilled in the art can clearly understand that, for convenience and conciseness of description, the divisions of the above functional units and modules are merely illustrative. In practical applications, the above functions can be allocated to different functional units and modules for implementation as required. That is, an internal structure of the above apparatus is divided into different functional units or modules to complete all or part of the functions described above. The functional units and modules in the embodiments may be integrated into one processing unit, or each unit may exist physically alone, or two or more units may be integrated into one unit. The integrated units can be implemented in a form of hardware, or in a form of a software functional unit. In addition, specific names of the functional units and modules are only for the convenience of distinguishing one from another, and are not used to limit the scope of the present disclosure. For a specific working process of the units and modules in the above system, reference may be made to a corresponding process in the above method embodiments, and details thereof will not be repeated herein.

In above embodiments, description of respective embodiments emphasizes different aspects, and for parts that are not detailed or described in some embodiments, reference may be made to relevant description of other embodiments.

Those skilled in the art could be aware that, exemplary units and algorithm steps described in combination with embodiments disclosed herein may be implemented by electronic hardware or in a combination of computer software and electronic hardware. Whether these functions are executed by hardware or software depends upon the specific use and design constraints of the technical solutions. Those skilled in the art may adopt different methods for different specific uses to implement described functions, which should not be regarded as going beyond the scope of the present disclosure.

In the embodiments provided by the present disclosure, it should be understood that, the disclosed apparatus/terminal and method may be implemented in other ways. For example, the apparatus/terminal embodiments described above are merely illustrative. For example, the modules or units are merely divided based on the logic functions, and they can be divided in other ways in actual implementations. For example, a plurality of units or components may be combined or may be integrated into another system, or some features may be omitted or not executed. In addition, the mutual coupling or direct coupling or communication connection between these units illustrated or discussed above may be via some interfaces, or the indirect coupling or communication connection between devices or units may be in an electrical, mechanical, or other manner.

The units described as separate parts may or may not be physically separated. Parts illustrated as units may or may not be physical units, i.e., the parts may be located in one place, or may be distributed on a plurality of network units. Some or all of the units can be selected according to actual needs to achieve objects of the solutions of the embodiments.

In addition, respective functional units in respective embodiments of the present disclosure may be integrated in one processing unit, or the respective units may be separate physical existence, or two or more units may be integrated in one unit. The above integrated units can be implemented in a form of hardware, or in a form of a functional software unit.

If the integrated modules/units are realized in a form of functional software units and are sold or used as separate products, the integrated modules/units can be stored in a computer-readable storage medium. Based on this understanding, all or part of the processes in the above method embodiments of the present disclosure may also be implemented by relevant hardware instructed by a computer program. The computer program can be stored in a computer-readable storage medium. When the computer program is executed by the processor, steps of the above method embodiments may be implemented. The computer program may include computer program codes. The computer program codes may be in a form of source codes, object codes, an executable file, or some intermediate forms, etc. The computer-readable medium may include any entity or device capable of carrying the computer program codes, a recording medium, a USB disk, a mobile hard disk, a magnetic disk, an optical disk, a computer memory, a Read-Only Memory (ROM), a Random Access Memory (RAM), and a software distribution medium, etc.

As mentioned above, the above embodiments are only used to illustrate, rather than to limit, the technical solutions of the present disclosure. Although the present disclosure is described in detail with reference to the above embodiments, those skilled in the art should understand that modifications may be made to the technical solutions described in the above embodiments, or equivalent replacements may be made to some of the technical features of the technical solutions described in the above embodiments. However, these modifications or replacements do not cause a deviation of the essence of corresponding technical solutions from the spirit and scope of the technical solutions of the embodiments of the present disclosure, and shall be contained in the scope of the present disclosure.

What is claimed is:

1. A method for measuring a geometric parameter of an object to be measured, comprising:
    establishing a three-dimensional coordinate system based on a real environment in accordance with a first depth image of the real environment photographed by a camera component;
    obtaining pose data of a terminal, obtaining a second depth image and a two-dimensional image of an object to be measured, and displaying the two-dimensional image on a display interface of the terminal;
    in response to a measurement point selection instruction, determining a coordinate in the three-dimensional coordinate system of a measurement point based on the pose data, the second depth image and the two-dimensional image, and determining the geometric parameter of the object to be measured based on the coordinate; and
    displaying, in the two-dimensional image, the geometric parameter of the object to be measured,
    wherein the method further comprises, prior to said receiving the measurement point selection instruction:
    obtaining a current measurement mode of the terminal; and
    in response to the current measurement mode of the terminal being a first automatic measurement mode, recognizing the object to be measured in the two-dimensional image, and determining whether a shape of the object to be measured is a regular or irregular shape, wherein:
    in response to determining that the shape of the object to be measured is the regular shape, each of respective end points of the regular shape and a point closest to the terminal in the regular shape is the measurement point, and the geometric parameter of the object to be measured comprises a distance parameter, a length parameter, and an area parameter of the object to be measured; and in response to determining that the shape of the object to be measured is the irregular shape, each of farthest points in four directions of an upward direction, a downward direction, a leftward direction, and a rightward direction of the irregular shape is the measurement point, and the geometric parameter of the object to be measured comprises a maximum height and a maximum width of the object to be measured.

2. The method according to claim 1, further comprising:
when a display region of the display interface comprises a saved measurement point, displaying a measurement mark of the saved measurement point, and displaying the geometric parameter corresponding to the coordinate of the saved measurement point.

3. The method according to claim 1, wherein said determining the coordinate in the three-dimensional coordinate system of the measurement point based on the pose data, the second depth image and the two-dimensional image comprises:
determining pixel coordinates of the measurement point on the two-dimensional image based on a position of the measurement point on the two-dimensional image and a corresponding depth value; and
mapping the pixel coordinates to the coordinate in the three-dimensional coordinate system based on parameter information of the camera component and the pose data.

4. The method according to claim 1, wherein
when the current measurement mode of the terminal is a distance measurement mode, the geometric parameter of the object to be measured is the distance parameter between the object to be measured and the terminal;
when the current measurement mode of the terminal is a length measurement mode, the geometric parameter of the object to be measured is the length parameter of the object to be measured;
when the current measurement mode of the terminal is an area measurement mode, the geometric parameter of the object to be measured is the area parameter of the object to be measured; and
when the current measurement mode of the terminal is an angle measurement mode, the geometric parameter of the object to be measured is an angle parameter of the object to be measured.

5. The method according to claim 4, wherein
in response to the current measurement mode of the terminal being an automatic measurement mode based on the distance measurement mode, recognizing the object to be measured in the two-dimensional image, determining the point closest to the terminal in the object to be measured as the measurement point, wherein the geometric parameter of the object to be measured comprises the distance parameter of the object to be measured; and
in response to the current measurement mode of the terminal being an automatic measurement mode based on the length measurement mode, recognizing the object to be measured in the two-dimensional image, and determining whether the shape of the object to be measured is the regular or irregular shape;
in response to the shape of the object to be measured being the regular shape, determining each of respective end points of the regular shape as the measurement point, wherein the geometric parameter of the object to be measured comprises the length parameter between adjacent measurement points of the object to be measured; and
in response to the shape of the object to be measured being the irregular shape, determining each of farthest points in four directions of the upward direction, the downward direction, the leftward direction, and the rightward direction of the irregular shape as the measurement point, wherein the geometric parameter of the object to be measured comprises the maximum height and the maximum width of the object to be measured.

6. The method according to claim 1, wherein said obtaining the pose data of the terminal comprises:
obtaining six-degrees-of-freedom pose data of the terminal in real time by using an Inertial Measurement Unit (IMU).

7. The method according to claim 1, wherein a point in the real environment corresponding to any piece of effective depth data in the first depth image is determined as a coordinate origin of the three-dimensional coordinate system.

8. The method according to claim 1, further comprising:
receiving a photographing instruction triggered by a user clicking a photographing control and obtaining an image carrying measurement data, wherein the measurement data comprises a measurement mark of the measurement point and the geometric parameter of the object to be measured of the object to be measured.

9. A terminal, comprising a camera component, a memory, a processor, and a computer program stored on the memory and executable on the processor, wherein the processor is configured to, when executing the computer program, implement steps of:
establishing a three-dimensional coordinate system based on a real environment in accordance with a first depth image of the real environment photographed by a camera component;
obtaining pose data of a terminal, obtaining a second depth image and a two-dimensional image of an object to be measured, and displaying the two-dimensional image on a display interface of the terminal;
in response to a measurement point selection instruction, determining a coordinate in the three- dimensional coordinate system of a measurement point based on the pose data, the second depth image and the two-dimensional image, and determining a geometric parameter of the object to be measured based on the coordinate; and
displaying, in the two-dimensional image, the geometric parameter of the object to be measured,
wherein the processor is further configured to, when executing the computer program, implement steps of:
obtaining a current measurement mode of the terminal; and
in response to the current measurement mode of the terminal being a first automatic measurement mode, recognizing the object to be measured in the two-dimensional image, and determining whether a shape of the object to be measured is a regular or irregular shape, wherein:
in response to determining that the shape of the object to be measured is the regular shape, each of respective end points of the regular shape and a point closest to the terminal in the regular shape is the measurement point, and the geometric parameter of the object to be measured comprises a distance parameter, a length parameter, and an area parameter of the object to be measured; and in response to determining that the shape of the object to be measured is the irregular shape, each of farthest points in four directions of an upward direction, a downward direction, a leftward direction, and a rightward direction of the irregular shape is the measurement point, and the geometric parameter of the object to be measured comprises a maximum height and a maximum width of the object to be measured.

10. The terminal according to claim 9, wherein the processor is further configured to, when executing the computer program, implement steps of:

when a display region of the display interface comprises a saved measurement point, displaying a measurement mark of the saved measurement point, and displaying the geometric parameter corresponding to the coordinate of the saved measurement point.

11. The terminal according to claim 9, wherein the processor is further configured to, when executing the computer program, implement steps of:

determining pixel coordinates of the measurement point on the two-dimensional image based on a position of the measurement point on the two-dimensional image and a corresponding depth value; and mapping the pixel coordinates to the coordinate in the three-dimensional coordinate system based on parameter information of the camera component and the pose data.

12. The terminal according to claim 9, wherein when the current measurement mode of the terminal is a distance measurement mode, the geometric parameter of the object to be measured is the distance parameter between the object to be measured and the terminal;

when the current measurement mode of the terminal is a length measurement mode, the geometric parameter of the object to be measured is the length parameter of the object to be measured;

when the current measurement mode of the terminal is an area measurement mode, the geometric parameter of the object to be measured is the area parameter of the object to be measured; and when the current measurement mode of the terminal is an angle measurement mode, the geometric parameter of the object to be measured is an angle parameter of the object to be measured.

13. The terminal according to claim 12, wherein the processor is further configured to, when executing the computer program, implement steps of:

in response to the current measurement mode of the terminal being an automatic measurement mode based on the distance measurement mode, recognizing the object to be measured in the two-dimensional image, determining the point closest to the terminal in the object to be measured as the measurement point, wherein the geometric parameter of the object to be measured comprises the distance parameter of the object to be measured; and in response to the current measurement mode of the terminal being an automatic measurement mode based on the length measurement mode, recognizing the object to be measured in the two-dimensional image, and determining whether the shape of the object to be measured is the regular or irregular shape;

in response to the shape of the object to be measured being the regular shape, determining each of respective end points of the regular shape as the measurement point, wherein the geometric parameter of the object to be measured comprises the length parameter between adjacent measurement points of the object to be measured; and in response to the shape of the object to be measured being the irregular shape, determining each of farthest points in four directions of the upward direction, the downward direction, the leftward direction, and the rightward direction of the irregular shape as the measurement point, wherein the geometric parameter of the object to be measured comprises the maximum height and the maximum width of the object to be measured.

14. The terminal according to claim 9, wherein the processor is further configured to, when executing the computer program, implement a step of:

obtaining six-degrees-of-freedom pose data of the terminal in real time by using an Inertial Measurement Unit (IMU).

15. The terminal according to claim 9, wherein a point in the real environment corresponding to any piece of effective depth data in the first depth image is determined as a coordinate origin of the three-dimensional coordinate system.

16. The terminal according to claim 9, wherein the processor is further configured to, when executing the computer program, implement a step of:

receiving a photographing instruction triggered by a user clicking a photographing control and obtaining an image carrying measurement data, wherein the measurement data comprises a measurement mark of the measurement point and the geometric parameter of the object to be measured.

17. A non-transitory computer-readable storage medium, encoded with a computer program, wherein the computer program, when executed by a processor, implements steps of the method according to claim 1.

* * * * *